M
US012071569B2

(12) United States Patent
Salomon et al.

(10) Patent No.: US 12,071,569 B2
(45) Date of Patent: Aug. 27, 2024

(54) BINDER COMPOSITION ON AN OLIGOESTER BASIS, PRODUCTION THEREOF, AND USE THEREOF FOR BINDING ORGANIC OR MINERAL FIBRES

(71) Applicant: SAINT-GOBAIN ISOVER, Courbevoie (FR)

(72) Inventors: Pierre Salomon, Courbevoie (FR); Edouard Obert, Fleurines (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 805 days.

(21) Appl. No.: 17/046,091

(22) PCT Filed: Apr. 15, 2019

(86) PCT No.: PCT/FR2019/050879
§ 371 (c)(1),
(2) Date: Oct. 8, 2020

(87) PCT Pub. No.: WO2019/202248
PCT Pub. Date: Oct. 24, 2019

(65) Prior Publication Data
US 2021/0040361 A1   Feb. 11, 2021

(30) Foreign Application Priority Data
Apr. 19, 2018 (FR) ........................ 1853442

(51) Int. Cl.
| | |
|---|---|
| C09J 167/04 | (2006.01) |
| C03C 25/321 | (2018.01) |
| C03C 25/323 | (2018.01) |
| C08G 63/40 | (2006.01) |
| C08J 5/04 | (2006.01) |
| C08K 3/32 | (2006.01) |
| D04H 1/4209 | (2012.01) |
| D04H 1/587 | (2012.01) |
| D04H 1/645 | (2012.01) |
| D06M 15/51 | (2006.01) |

(52) U.S. Cl.
CPC ........... *C09J 167/04* (2013.01); *C03C 25/321* (2013.01); *C03C 25/323* (2013.01); *C08G 63/40* (2013.01); *C08J 5/043* (2013.01); *C08K 3/32* (2013.01); *D04H 1/4209* (2013.01); *D04H 1/587* (2013.01); *D04H 1/645* (2013.01); *D06M 15/51* (2013.01); *C08J 2303/02* (2013.01); *C08J 2305/00* (2013.01); *C08J 2367/04* (2013.01); *C08J 2397/00* (2013.01)

(58) Field of Classification Search
CPC ........ C08K 5/0025; C08K 5/092; C08K 5/11; C08K 9/04; C08L 67/02; C08L 67/00; C09J 103/02; C09J 103/04; C09J 105/06; C09J 167/04; C08G 63/40; C08J 2397/00
See application file for complete search history.

(56) References Cited

U.S. PATENT DOCUMENTS

| | | | | |
|---|---|---|---|---|
| 6,176,973 | B1 * | 1/2001 | Norlander | ............... A61L 15/28 162/182 |
| 8,864,893 | B2 * | 10/2014 | Hawkins | .................. C08K 3/32 106/206.1 |
| 9,546,263 | B2 * | 1/2017 | Hawkins | .................. C08K 7/14 |
| 9,718,729 | B2 * | 8/2017 | Hernandez-Torres | ...................... C09J 103/02 |
| 2004/0038017 | A1 | 2/2004 | Tutin et al. | |
| 2010/0282996 | A1 | 11/2010 | Jaffrennou et al. | |
| 2011/0021101 | A1 * | 1/2011 | Hawkins | .............. D04H 1/4218 527/311 |

(Continued)

FOREIGN PATENT DOCUMENTS

| | | | | |
|---|---|---|---|---|
| EP | 3034555 | A1 * | 6/2016 | ............. C03C 25/32 |
| FR | 2924719 | A1 | 6/2009 | |

(Continued)

OTHER PUBLICATIONS

Malgorzata Grembecka "Sugar alcohols—their role in the modern world of sweeteners: a review", Eur Food Res Technol, 2014 (Year: 2014).*

(Continued)

*Primary Examiner* — Ling Siu Choi
*Assistant Examiner* — Gennadiy Mesh
(74) *Attorney, Agent, or Firm* — Element IP, PLC

(57) ABSTRACT

The present invention relates to a thermosetting binder composition containing water and a water-soluble oligomeric ester of at least one saccharide chosen from reducing sugars, non-reducing sugars and hydrogenated sugars, the hydrogenated sugars being chosen from the group consisting of erythritol, arabitol, xylitol, sorbitol, mannitol, iditol, maltitol, isomaltitol, lactitol, cellobitol, palatinitol, maltotritol and hydrogenation products of hydrolyzates of starch or of lignocellulose materials, and of at least one polycarboxylic acid, the binder composition having a dry matter content of between 50% and 80% by weight, the water-soluble oligomeric ester representing at least 80% by weight, preferably at least 90% by weight, of the cry matter content of the thermosetting binder composition, and the thermosetting binder composition containing less than 10% by weight, preferably less than 5% by weight, with respect to its dry matter content, of free sorbitol.

It also relates to the use of such a binder composition for the manufacture of a product based on mineral or organic fibers which are bonded by an insoluble organic binder.

18 Claims, 2 Drawing Sheets

(56) References Cited

U.S. PATENT DOCUMENTS

| | | | |
|---|---|---|---|
| 2012/0090505 A1 | 4/2012 | Jaffrennou et al. | |
| 2014/0038485 A1 | 2/2014 | Anderson et al. | |
| 2014/0061554 A1 | 3/2014 | Alberst et al. | |
| 2014/0137771 A1* | 5/2014 | Jaffrennou | C03C 25/321 |
| | | | 106/217.7 |
| 2015/0152244 A1 | 6/2015 | Hernandez-Torres | |
| 2017/0036955 A1* | 2/2017 | Obert | D06B 1/02 |
| 2018/0312661 A1 | 11/2018 | Hernandez-Torres et al. | |

FOREIGN PATENT DOCUMENTS

| | | |
|---|---|---|
| WO | WO03106561 A1 | 12/2003 |
| WO | WO2012138723 A1 | 10/2012 |

OTHER PUBLICATIONS

M. Lawson "Sugar Alcohols", Kirk-Othmer Encyclopedia of Chemical Technology. John Wiley & Sons, Inc (Year: 2000).*

International Search Report issued Sep. 11, 2019 in PCT/FR2019/050879 (with English translation), 5 pages.

* cited by examiner

BINDER COMPOSITION ON AN OLIGOESTER BASIS, PRODUCTION THEREOF, AND USE THEREOF FOR BINDING ORGANIC OR MINERAL FIBRES

The present patent application relates to an aqueous thermosetting binder based on water-soluble oligomeric esters obtained by reaction between a carbohydrate and a polycarboxylic acid.

It also relates to the use of such a binder for bonding together organic or mineral fibers, in particular fibers of mineral wool, in particular of glass or rock wool.

It has been known for several years to use aqueous compositions based on biobased reactants, in particular based on sugars, as thermosetting binders for mineral wools or nonwoven products based on mineral fibers.

It has been proposed in particular to form thermoset polyesters by reacting reducing sugars and/or nonreducing sugars and/or hydrogenated sugars, comprising hydroxyl groups, with polycarboxylic acids in the presence of a catalyst, generally sodium hypophosphite (WO 2009/080938, WO 2010/029266, WO 2013/014399, WO 2013/021112).

International application WO 2012/138723 discloses sizing compositions based on oligomeric and/or polymeric carbohydrates (dextrose equivalent 2-20) and on a crosslinking agent chosen from polycarboxylic acids. These compositions also contain an oligoester having a weight-average molecular weight of between 1500 and 5000, obtained by reaction of polycarboxylic acid and glycerol.

The sizing compositions described in the aforementioned documents are dilute, low-viscosity aqueous solutions of monomeric reactants. They are generally sprayed onto the still-hot mineral fibers immediately after formation thereof. Immediately after application of the sizing composition onto the fibers, the aqueous phase begins to evaporate. When the fibers are collected and assembled in the form of a mat on the collecting belt, they are tacky and the film of sizing composition which envelops the glass fibers still contains water.

It is only when the mat of sized mineral wool enters the drying oven, typically thermostatically controlled at temperatures of greater than 180° C., indeed even of greater than 200° C., that the evaporation of the water is completed and that the esterification reaction between the reactants begins.

The heating of the mat of sized fibers at high temperatures for a few tens or hundreds of seconds results in the crosslinking of the reactive system by esterification and in the formation of a water-insoluble binder, but also in the thermal decomposition of some of the reactants and the evaporation of the resulting decomposition products. The gaseous components formed in the drying oven are partially evacuated via the stack. The exhaust gases, or flue gases, are treated in a scrubbing system and the aqueous scrubbing liquors are then recycled in a closed system.

When the sizing composition contains carboxylic acids, such as citric acid, the flue gases contain many acidic compounds which must be neutralized by the addition of bases in order to prevent degradation of the installation by corrosion. The addition of bases is problematic, however. This is because, in installations for manufacturing glass wool-based insulation products, the aqueous scrubbing liquors are reinjected into the system and is used in particular for the preparation of binder compositions and binding compounds. The presence of large amounts of bases or of salts in the sizing compositions however is likely to increase the pH and to interfere with the esterification reaction (crosslinking).

The applicant has thus detected, inter alia, the presence of citric acid, citraconic acid, itaconic acid, propionic acid, acetic acid, and traces of formic acid in the exhaust gas aqueous scrubbing liquors of a binder system based on sugar alcohols and citric acid.

The present invention is based on the discovery that it was possible to significantly limit the emission of volatile acidic components at the stack of a glass wool curing oven, by subjecting the starting reactive system, based on polyols and on polyacids, to a preliminary oligomerization reaction by polycondensation (esterification) in an essentially anhydrous medium. The oligomeric esters thus prepared may be used in the same way as the reactants of the binders based on sugars and/or on sugar alcohols and on acids. They are water-soluble and stable in water at ambient temperature, form pumpable and infinitely dilutable aqueous solutions and have, at the concentrations commonly used for binding compounds (2%-6% by weight), viscosities which are perfectly compatible with a conventional system for sizing by spraying by means of nozzles (spraying ring).

In addition, the use of oligomers instead of the polyol and polyacid reactants has the advantage of significantly reducing the crosslinking start temperature of the reactive system and/or of shortening, for a given drying oven temperature, the time required for satisfactory hardening of the binder, which enables speeding-up of the glass wool production line and/or energy savings for heating the oven.

Finally, the reduction in the loss of citric acid by decomposition and emission in the flue gases at the stack is reflected by an increase in the efficiency of the industrial line (binder line efficiency, BLE), which is the ratio of the amount of hardened binder in the final product to the total amount of solids of binder and additives sprayed onto the fibers.

The present patent application relates to a thermosetting binder composition containing water and a water-soluble oligomeric ester of at least one carbohydrate chosen from reducing sugars, non-reducing sugars and hydrogenated sugars, the hydrogenated sugars being selected from the group consisting of erythritol, arabitol, xylitol, sorbitol, mannitol, iditol, maltitol, isomaltitol, lactitol, cellobitol, palatinitol, maltotritol and hydrogenation products of hydrolyzates of starch or of lignocellulosic materials, and of at least one polycarboxylic acid, the binder composition having a dry matters content of between 40% and 80% by weight and the water-soluble oligomeric ester representing at least 80% by weight, preferably at least 90% by weight, of the dry matters of the thermosetting binder composition.

In the present patent application, the term "saccharide" has a broader meaning than usual, as it encompasses not only carbohydrates in the strict sense, that is to say reducing sugars or hydrates of carbon of formula $C_n(H_2O)_p$ where $p=n$ (monosaccharides) or $p=n-1$ (oligo- and polysaccharides) and exhibiting at least one aldehyde or ketone group (reducing group), but also the hydrogenation products of these hydrates of carbon in which the aldehyde or ketone group has been reduced to an alcohol. These hydrogenation products are also called alditols, sugar alcohols or hydrogenated sugars. The term "saccharide" also encompasses non-reducing sugars composed of several carbohydrate units, the carbons bearing the hemiacetal hydroxyl of which are involved in glycosidic bonds linking the units together.

In the present patent application, the terms "binder composition" and "sizing compositions" are not synonymous.

The term "binder composition" denotes concentrated aqueous solutions, that is to say having a high content of solid matter (several tens of percent). These compositions may be stored and transported. They are fluid enough to be pumped, but too viscous to be sprayed as is onto the fibers. The term "sizing composition" denotes considerably less concentrated aqueous solutions, having a dry matter content of less than 10% by weight. They are generally obtained by diluting the binder compositions with water. They have viscosities which are sufficiently low to allow their application onto glass wool fibers by spraying by means of nozzles.

The present patent application also discloses a process for preparing a binder composition comprising a step of synthesizing the oligomers by esterification of the reactants in an essentially anhydrous medium, followed by a step of diluting the resulting reaction product with water.

More precisely, the process for preparing the binder compositions of the present invention comprises
the heating of a mixture of at least one saccharide selected from reducing sugars, non-reducing sugars and hydrogenated sugars, of at least one polycarboxylic acid and of at least one esterification catalyst, at a temperature of between 105° C. and 170° C., preferably between 120° C. and 150° C., for a period of between 5 minutes and 10 hours, preferably of between 20 minutes and 2 hours, so as to form an oligomeric ester, and
the addition of a quantity of water sufficient to obtain a pumpable aqueous solution of the oligomeric ester.

As explained hereinabove, the reaction mixture of this bulk polycondensation is preferably essentially anhydrous, that is to say it preferably contains less than 2% of water, preferably less than 1% of water. In certain cases, it may be necessary to add a small quantity of water, generally of less than 5% by weight, in order to homogenize the reactants in the reaction mixture. This water required for the homogenization evaporates under the effect of the heating.

A preferred embodiment of the process for synthesizing the oligoesters comprises the heating of the saccharide, in the absence of solvent, until it has completely melted, then addition of the citric acid and of the catalyst. The reaction times depend on the change in the viscosity of the medium during the synthesis.

The progression of the oligomerization reaction may be monitored by viscosimetry in the following manner: An aliquot of the reaction medium is withdrawn and diluted with distilled water so as to obtain a solution having a content of solid matter (solids content) equal to 70%. This solution is introduced into an Anton Paar MCR302 rheometer having a 50 mm cone/plate upper geometry and a 50 mm plate lower geometry, which makes possible high sensitivity at low viscosities. The viscosity of the oligomers is measured at room temperature for shear rates increasing from $5\ s^{-1}$ to $1000\ s^{-1}$, then reducing again from $1000\ s^{-1}$ to $5\ s^{-1}$. It is observed that the viscosity does not depend on the shear rate. The oligomer solutions are therefore newtonian liquids. The viscosity values are read off at 20° C. at a shear rate of $100\ s^{-1}$.

The objective of studying the kinetics of the oligomerization reaction is to find the best compromise between, on the one hand, an acceptable viscosity, that is to say a sufficiently low viscosity for the quite concentrated binder compositions to remain pumpable, and, on the other hand, the lowest possible crosslinking start temperature.

The crosslinking start temperature is determined by dynamic mechanical thermal analysis (DMTA), which makes it possible to characterize the viscoelastic behaviour of a polymeric material. Two strips of paper made of glass microfibers are cut out and superimposed. Thirty milligrams of binder composition having a content of solid matter of 30% are deposited homogeneously over the strips, which are subsequently horizontally attached between two jaws of an RSAIII appliance (Texas Instruments). An oscillating component equipped with a device for measuring the stress as a function of the strain applied is positioned on the upper face of the sample. The device makes it possible to determine the modulus of elasticity E'. The sample is heated to a temperature varying from 20 to 250° C. at the rate of 4° C./min. The curve of variation in the modulus of elasticity E' (in MPa) as a function of the temperature (in ° C.) is plotted from the measurements, the general appearance of the curve being given in FIG. 1.

The DMTA curves are modelled in three straight-line segments:
1) tangent to the curve before the start of the reaction,
2) slope of the straight line during the increase in the modulus during reaction,
3) tangent to the curve after the end of the increase in the modulus.

The crosslinking start temperature (CST) is the temperature at the intersection of the first two straight lines.

When the desired degree of oligomerization is reached, the heating is stopped and water is added to the reaction mixture so as to obtain the binder compositions of the present invention.

The Brookfield viscosity of the binder compositions, determined at ambient temperature (20° C.) at a solids content of 70% by weight, is advantageously between 0.25 and 4.0 Pa·s, preferably between 0.3 and 1.5 Pa·s, and in particular between 0.35 and 1.0 Pa·s.

The crosslinking start temperature of the binder compositions of the present invention, determined in the manner described hereinabove, is advantageously between 105° C. and 125° C.

For the preparation of the thermosetting binder compositions of the present invention, it is possible in principle to use any saccharide whatsoever selected from reducing sugars, non-reducing sugars and hydrogenated sugars.

"Hydrogenated sugar" is intended to mean all the products resulting from the reduction of a saccharide (carbohydrate) selected from monosaccharides, disaccharides, oligosaccharides and polysaccharides and mixtures of these products. Hydrogenated sugars are also referred to as sugar alcohols, alditols or polyols. They may be obtained by catalytic hydrogenation of saccharides. The hydrogenation may be carried out by known methods, operating under conditions of high hydrogen pressure and high temperature, in the presence of a catalyst chosen from the elements of Groups Ib, IIb, IVb, VI, VII and VIII of the Periodic Table of the Elements, preferably from the group consisting of nickel, platinum, palladium, cobalt, molybdenum and the mixtures thereof. The preferred catalyst is Raney nickel.

The hydrogenated sugar(s) are chosen from the group consisting of erythritol, arabitol, xylitol, sorbitol, mannitol, iditol, maltitol, isomaltitol, lactitol, cellobitol, palatinitol, maltotritol and hydrogenation products of hydrolyzates of starch or of hydrolyzates of lignocellulose materials, in particular of hemicellulose, in particular of xylans and xyloglucans. The hydrogenated sugars used in the present invention consequently do not encompass glycerol or polyglycerol.

Starch hydrolyzates are products obtained by enzymatic and/or acid hydrolysis of starch. The degree of hydrolysis is generally characterized by the dextrose equivalent (DE), defined by the following relationship:

$$DE = 100 \times \left(\frac{\text{number of glycosidic bonds broken}}{\text{number of glycosidic bonds in the initial starch}}\right)$$

The preferred starch hydrolyzates have, before the hydrogenation step, a DE of between 5 and 99, and advantageously between 10 and 80.

Particular preference will be given to using a hydrogenated sugar chosen from the group consisting of maltitol, xylitol, sorbitol and hydrogenation products of hydrolyzates of starch or of lignocellulose materials.

Among the hydrogenated sugars described hereinabove, sorbitol is the most readily available on the market and the cheapest. The applicant company, during its tests aiming to develop binders based on polycarboxylic acids and on hydrogenated sugars, has found, however, that this hydrogenated sugar, when it was used as is, did not allow to easily obtain insulating products exhibiting satisfactory mechanical properties (tensile strength, thickness recovery, flexural strength). In order to impart a certain mechanical strength on the resulting insulating products, it was necessary to considerably increase the polycarboxylic acid/sorbitol ratio of the binding compounds. However, such an increase exhibits a threefold disadvantage: it increases the corrosive nature of the binding compounds, promotes the release of acidic degradation products at the stack and reduces the efficiency of the industrial line (binder line efficiency), in particular when the acid used is citric acid, which undergoes thermal degradation at temperatures of less than 200° C.

The present invention makes it possible to avoid the drawbacks described above which are linked to the use of sorbitol as hydrogenated sugar. This is because the preoligomerization of the sorbitol in an anhydrous medium in the presence of polycarboxylic acids affords oligoesters which have properties equivalent to those based on xylitol or on maltitol, for example.

In the light of the foregoing, obtaining insulating products based on mineral wool and having satisfactory mechanical properties obviously supposes that no, or only very little, free sorbitol is added to the binder composition after the end of the esterification step. In other words, the advantage obtained by the present invention, namely obtaining good mechanical properties despite the use of sorbitol, would be lost if free sorbitol were added in excessive amounts at the time of the preparation of the sizing composition by dilution of the binder composition of the present invention.

The binder composition and the sizing composition of the present invention consequently contain less than 10% by weight, preferably less than 5% by weight, even more advantageously less than 2% by weight, of free sorbitol, added after the esterification step or not having reacted during the esterification. These percentages of free sorbitol are expressed with respect to the total dry matter content of the binder composition or of the sizing composition of the present invention.

The reducing sugars are preferably chosen from monosaccharides, such as glucose, galactose, mannose and fructose, disaccharides, such as lactose, maltose, isomaltose and cellobiose, and hydrolyzates of starch or of lignocellulose materials described hereinabove. Glucose and fructose, in particular glucose, will preferably be used.

The non-reducing sugars are preferably disaccharides, such as trehalose, isotrehaloses, sucrose and isosucroses. Sucrose is particularly preferred.

The polycarboxylic acid(s) used in the present invention are monomeric polycarboxylic acids. In other words, in the present invention, this term does not encompass the polymers obtained by polymerization of monomeric carboxylic acids, such as homopolymers or copolymers of acrylic acid or of methacrylic acid.

Polycarboxylic acids chosen from the group consisting of dicarboxylic acids, tricarboxylic acids and tetracarboxylic acids will preferably be used. The particularly preferred polycarboxylic acid is citric acid.

The applicant company has performed numerous tests to determine the respective proportions of saccharides and of polycarboxylic acid which result in binders which, in the crosslinked state, impart the best mechanical properties on the final glass wool product, in particular after accelerated aging under humid conditions.

These tests have shown that the carbohydrate/citric acid weight ratio is advantageously between 25/75 and 55/45, preferably between 30/70 and 50/50.

Bulk oligomerization may be carried out in the presence of a known esterification catalyst chosen for example from strong acids, such as sulfuric acid, hydrochloric acid, para-toluenesulfonic acid, trifluoromethanesulfonic acid and trifluoroacetic acid, and Lewis acids commonly used for the catalysis of esterification reactions.

The bulk oligomerization reaction, when it uses citric acid, may also be catalysed by sodium hypophosphite, which is not strictly speaking an esterification catalyst but which is believed to promote the formation of citric acid anhydrides. The latter are more reactive than the triacid and are capable of reacting with the polyols.

One or the other of these two types of catalysts will therefore be present in the thermosetting binder composition.

When an esterification catalyst, such as a strong acid, is used for the catalysis of the oligomerization reaction, it is desirable to add to the binder composition, before or after dilution with water for the purpose of obtaining the binding compound, an effective quantity of sodium hypophosphite or of hypophosphorous acid, for example a quantity of between 0.5% and 10% by weight, preferably of between 1.0% and 5% by weight, with respect to the weight of the solid matter of the binder composition. This is because, to date, sodium hypophosphite and the corresponding acid are the compounds which most effectively catalyse the curing of the oligomers to give water-insoluble thermoset binder.

The viscosity and the crosslinking start temperatures of the compositions are not the only criteria to be taken into consideration in order to evaluate the quality of the binder compositions of the present invention. Another important parameter is the residual content of free polycarboxylic acid, that is to say acid which has not reacted with a saccharide present in the reaction mixture. This residual content of free polycarboxylic acid is preferably the lowest possible. This is because, as explained in the introduction, the polycarboxylic acid, and in particular citric acid, on entry into the drying oven and within the drying oven, undergoes thermal degradation reflected by undesirable acidic gas emissions.

The residual content of polyacid decreases as the polyol/polyacid ratio and the degree of progress of the oligomerization reaction increase.

The binder compositions of the present invention advantageously contain less than 20% by weight, preferably less than 15% by weight, more preferentially less than 10% by weight, and in particular less than 5% by weight, with respect to the total content of solid matter, of residual free polycarboxylic acid.

The binder compositions of the present invention must be able to be stored and transported, that is to say they must be stable on storage at ambient temperature and must not undergo substantial hydrolysis of the oligoesters to give polyols and polyacid, despite the presence of relatively large quantities of water possibly ranging from 20% to 50% by weight.

The applicant company has shown that good stability on storage of the compositions was obtained when they exhibited a neutral or acidic pH, preferably of between 1 and 7, more preferentially of between 3 and 6.

Finally, the present patent application relates to a process for the manufacture of a product based on mineral or organic fibers which are bonded by an insoluble organic binder, using a binder composition according to the invention. This process comprises the following successive steps:
(a) preparation of a sizing composition by diluting a thermosetting binder composition as described hereinabove with water down to a content of solid matter of between 2% and 10% by weight,
(b) application of the binding compound to mineral or organic fibers,
(c) formation of a collection of sized mineral or organic fibers, and
(d) the heating of the resulting collection of sized mineral or organic fibers until the binding compound has cured.

To obtain good-quality products, it is necessary for the sizing composition to exhibit good sprayability and to be able to be deposited in the form of a thin film at the surface of the fibers in order to bind them efficiently. The sprayability of the binding compound is directly linked to the possibility of diluting the concentrated binder composition with a large quantity of water. The diluted binding compound must be a solution, stable over time, which does not give rise to demixing phenomena.

The aptitude for dilution is characterized by the "dilutability", which is defined as being the volume of deionized water which it is possible, at a given temperature, to add to one unit of volume of the binder composition before the appearance of permanent cloudiness. It is generally considered that a binder composition may be used as size when its dilutability is equal to or greater than 1000%, at 20° C.

The binder compositions of the present invention have a dilutability of greater than 2000%.

It is of course entirely conceivable to implement the process for the manufacture of a product based on mineral or organic fibers of the present invention by preparing the diluted aqueous binding compound directly from the oligomerization product obtained by the bulk esterification of the polyacid and of the carbohydrate, without preparation of a concentrated intermediate solution (binder composition). This variant of the process might be useful when the synthesis of the oligomeric ester takes place on the same site as the manufacture of the final product based on mineral or organic fibers. It is considered to be completely equivalent to that comprising the preparation of a concentrated intermediate solution intended for storage and/or transport.

The step of preparing the binding compound advantageously comprises the addition of one or more known additives commonly used in the technical field of mineral wools. These additives are chosen for example from dust-preventing additives, silicones and coupling agents.

In a particularly preferred embodiment of the process of the invention, the addition to the binder composition of large amounts of monomers capable of reacting with the oligoesters, such as reducing sugars, non-reducing sugars, hydrogenated sugars, or other polyols, or even amines, in particular alkanolamines, will be avoided.

The binding compound, when it is applied to the mineral or organic fibers, consequently preferably comprises at least 80% by weight, more preferentially at least 85% by weight, indeed even at least 90% by weight, with respect to its total content of solid matter, of water-soluble oligomeric ester.

In one advantageous embodiment of the process of the invention, the fibers are mineral fibers and the assemblage of fibers is mineral wool.

EXAMPLES

Synthesis of an Oligomer of Xylitol and of Citric Acid

In a reactor thermostatically controlled at 150° C., 70 parts by weight of xylitol are heated until completely melted, then 30 parts by weight of citric acid and 1 part of sodium hypophosphite are added thereto all at once with stirring. Stirring is maintained and the temperature of 150° C. is maintained for the entire duration of the reaction.

After 5, 10, 30, 60, 90 and 120 minutes, an aliquot of reaction mixture is withdrawn and diluted with water down to a content of solid matter of 70% by weight.

This concentrated oligomer solution is used for the determination of the viscosity (Anton Paar MCR302 rheometer, 20° C., shear rate of 100 s$^{-1}$) and for the determination of the crosslinking start temperature by dynamic thermal mechanical analysis (DTMA).

Figure 1:
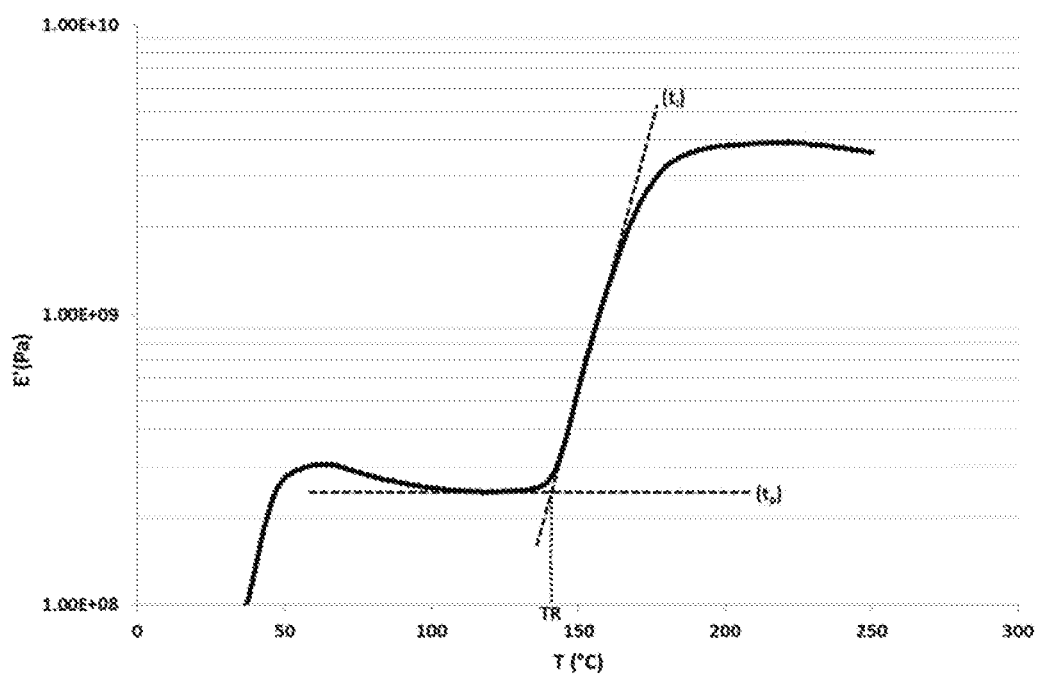
FIG. 1 provides the general appearance of the curve of variation in the modulus of elasticity E' (in MPa) as a function of the temperature (in ° C.)
Figure 2:
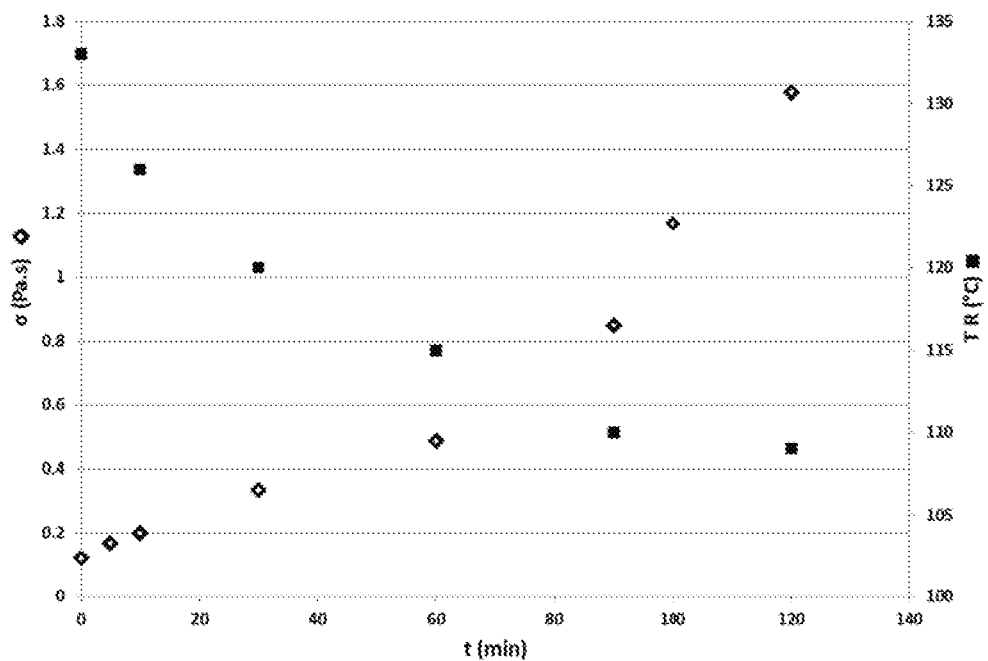
FIG. 2 shows the change in the viscosity and in the crosslinking start temperature as a function of the reaction time for an oligomer of xylitol and citric acid.

FIG. 2 shows the change in the viscosity and in the crosslinking start temperature as a function of the reaction time.

It is observed that the viscosity of a concentrated oligomer solution (70% by weight of solid matter) increases steadily throughout the reaction. After 2 hours, it is greater than 1.6 Pa·s.

The crosslinking start temperature decreases sharply during the first hour from more than 130° C. to approximately 115° C., then appears to reach a plateau at approximately 110° C.

The reaction mixture obtained after 60 minutes of oligomerization at 150° C. is used to compare its crosslinking kinetics with those of a xylitol/citric acid/SHP mixture (70/30/1).

For this, the reaction mixture is diluted in water until a diluted solution having a content of solid matter of 20% by weight is obtained. As comparison, an aqueous solution of non-preoligomerized xylitol/citric acid/SHP (70/30/1) having the same content of solid matter is prepared.

Two series of glass fabrics are respectively impregnated with these two aqueous binding compounds and then the fabrics are passed over a suction device which makes it possible to remove the surplus solution. The impregnated glass fabrics are subsequently hardened in a drying oven thermostatically controlled at 220° C. After curing for 18 seconds, 25 seconds, 35 seconds, 50 seconds and 70 seconds, a sample is subjected to a determination of the tensile strength. For this, the fabrics are cut into bands (250 mm×50 mm) and their ends are inserted into the jaws of a tensile testing device.

Figure 3:
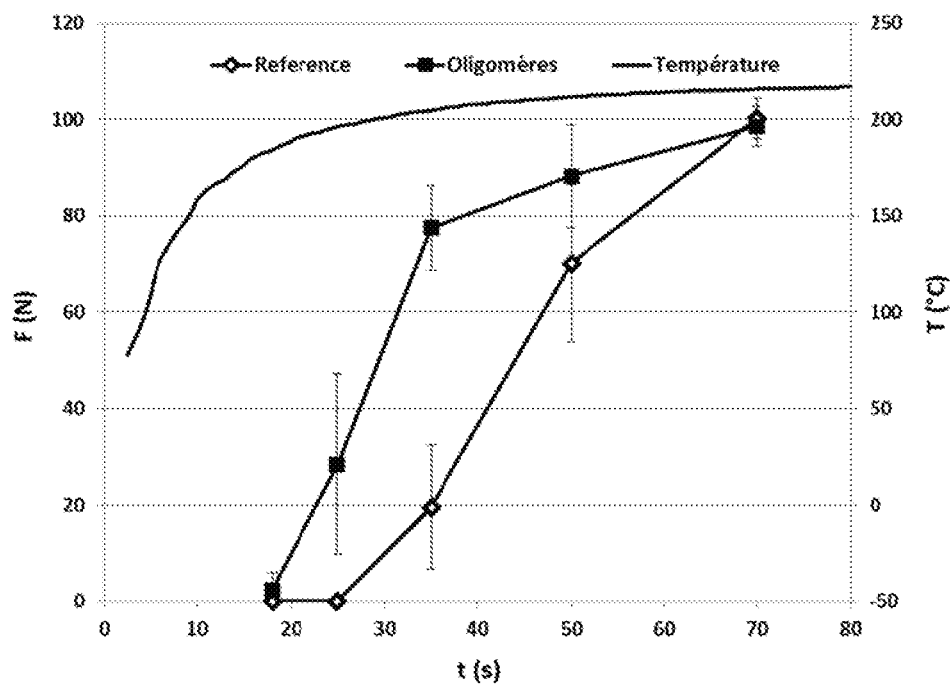
FIG. 3 shows the change in the tensile strength as a function of the curing time at 220° C. of the fabrics of glass fibers impregnated with a binding compound according to the invention.

FIG. 3 shows the change in the tensile strength as a function of the curing time at 220° C. of the fabrics of glass fibers impregnated with a binding compound according to the invention containing oligomers of xylitol and of citric acid and SHP, in comparison with glass fabrics impregnated with a binding compound containing xylitol, citric acid and SHP.

It is observed that the crosslinking speed of the binding compound according to the invention is significantly higher than that of the comparative nonpreoligomerized composition. After 35 seconds, the breaking strength of the sample according to the invention exhibits a tensile strength of approximately 80 N, whereas that of the comparative sample is only 20 N. The two curves converge after 70 seconds of curing, that is to say the final mechanical properties are the same for both fabrics bonded by a completely hardened binder.

These results show that, by virtue of the pre-oligomerization of the hydrogenated sugar and of the polyacid, it is possible to shorten the curing time of the binder, that is to say to accelerate the line or else to shorten the dimensions of the curing oven, which in both cases represents a saving in energy.

The same two binding compounds are used to produce glass wool on a pilot line.

Glass wool is manufactured by the internal centrifugation technique in which the molten glass composition is converted into fibers using a tool referred to as a centrifugation spinner, comprising a pan forming the chamber for receiving the molten composition and a peripheral strip pierced with a multitude of orifices: the spinner is rotated about its vertically arranged axis of symmetry, the composition is ejected through the orifices under the effect of the centrifugal force and the material escaping from the orifices is drawn into fibers with the assistance of a stream of drawing gas.

Conventionally, a size-spraying ring is arranged beneath the fiberizing spinner so as to distribute the binding compound evenly over the glass wool that has just been formed.

The mineral wool thus sized is collected on a belt conveyor fitted with internal suction chambers which hold the mineral wool in the form of a felt or of a lap at the surface of the conveyor. The conveyor then circulates in a curing oven maintained at 200° C. where the constituents of the size polymerize to form a binder. The insulating product obtained exhibits a nominal density equal to 10.5 kg/m³, a nominal thickness of approximately 80 mm and a loss on ignition of the order of 5%.

Table 1 below shows the quantities of different acidic chemical species detected in the gaseous emissions captured at the stack overhanging the inlet of the curing tank.

TABLE 1

| | Concentration of the acid in the gaseous emissions of the stack (mg/Nm³) | | |
|---|---|---|---|
| | Comparative binding compound | Preoligomerized binding compound | Reduction (%) |
| Citric acid | 360 | 105 | 70 |
| Citraconic acid | 405 | 250 | 38 |
| Itaconic acid | 55 | 25 | 55 |
| Propionic acid | 45 | 25 | 44 |
| Acetic acid | 12 | 9 | 25 |

It is observed that the pre-oligomerization of the reactants substantially reduces the emissions of acidic species.

The invention claimed is:

1. A thermosetting binder composition comprising:
   water; and
   a water-soluble oligomeric ester of citric acid and at least one saccharide selected from the group consisting of erythritol, arabitol, xylitol, sorbitol, mannitol, iditol, maltitol, isomaltitol, lactitol, cellobitol, palatinitol, maltotritol, and hydrogenation products of hydrolyzates of starch having dextrose equivalent (DE) before the hydrogenation step in range between 25 and 99,
   wherein the thermosetting binder composition has a dry matter content of between 40% and 80% by weight,
   wherein the water-soluble oligomeric ester represents at least 80% by weight of the dry matter content of the thermosetting binder composition, and
   wherein the thermosetting binder composition contains less than 10% by weight, with respect to its dry matter content, of free sorbitol.

2. The thermosetting binder composition as claimed in claim 1, wherein the at least one saccharide is selected from the group consisting of xylitol, maltitol, sorbitol and hydrogenation products of hydrolyzates of starch having dextrose equivalent (DE) before the hydrogenation step in range between 25 and 99.

3. The thermosetting binder composition as claimed in claim 1, wherein the saccharide/citric acid weight ratio is between 25/75 and 55/45.

4. The thermosetting binder composition as claimed in claim 1, having a Brookfield viscosity, determined at 20° C. at a solids content of 70% by weight, between 0.25 and 4.0 Pa·s.

5. The thermosetting binder composition as claimed in claim 1, having a pH of between 1 and 7.

6. The thermosetting binder composition as claimed in claim 1, comprising less than 10% by weight, with respect to the content of solid matter, of residual free citric acid.

7. The thermosetting binder composition as claimed in claim 1, further comprising:
   at least one esterification catalyst.

8. The thermosetting binder composition as claimed in claim 1, further comprising:
   sodium hypophosphite.

9. The thermosetting binder composition as claimed in claim 1,
   wherein the water-soluble oligomeric ester represents at least 90% by weight of the dry matter content of the thermosetting binder composition, and
   wherein the thermosetting binder composition contains less than 5% by weight, with respect to its dry matter content, of free sorbitol.

10. The thermosetting binder composition as claimed in claim 3, wherein the saccharide/citric acid weight ratio is between 30/70 and 50/50.

11. The thermosetting binder composition as claimed in claim 1, having a Brookfield viscosity, determined at 20° C. at a solids content of 70% by weight, between 0.3 and 1.5 Pa·s.

12. The thermosetting binder composition as claimed in claim 1, comprising less than 5% by weight, with respect to the content of solid matter, of residual free citric acid.

13. The thermosetting binder composition as claimed in claim 1, wherein the at least one saccharide is xylitol.

14. The thermosetting binder composition as claimed in claim 1, wherein the water-soluble oligomeric ester represents at least 90% by weight of the dry matter content of the thermosetting binder composition.

15. The thermosetting binder composition as claimed in claim 1, wherein said water-soluble oligomeric ester is a water-soluble oligomeric ester of citric acid and at least one saccharide selected from the group consisting of xylitol, maltitol, and sorbitol.

16. The thermosetting binder composition as claimed in claim 1, wherein said water-soluble oligomeric ester is a water-soluble oligomeric ester of citric acid and at least one saccharide selected from the group consisting of xylitol, maltitol and sorbitol, wherein the saccharide/citric acid weight ratio is between 30/70 and 50/50, and wherein the water-soluble oligomeric ester represents at least 90% by weight of the dry matter content of the thermosetting binder composition.

17. The thermosetting binder composition as claimed in claim 16, having a Brookfield viscosity, determined at 20° C. at a solids content of 70% by weight, between 0.25 and 4.0 Pa·s and a pH of between 1 and 7.

18. The thermosetting binder composition as claimed in claim 1, wherein said water-soluble oligomeric ester is a water-soluble oligomeric ester of citric acid and hydrogenation products of hydrolyzates of starch having dextrose equivalent (DE) before the hydrogenation step in range between 25 and 99.

* * * * *